Patented July 31, 1945

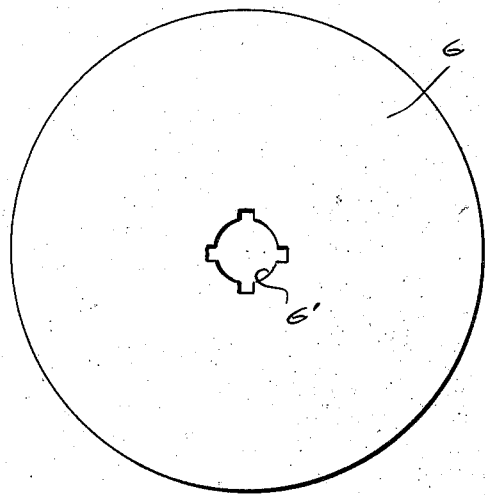
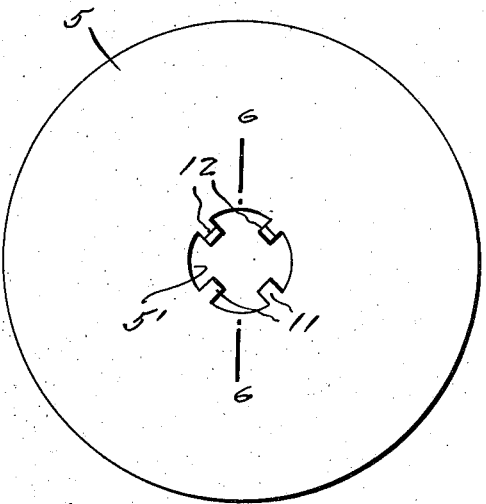
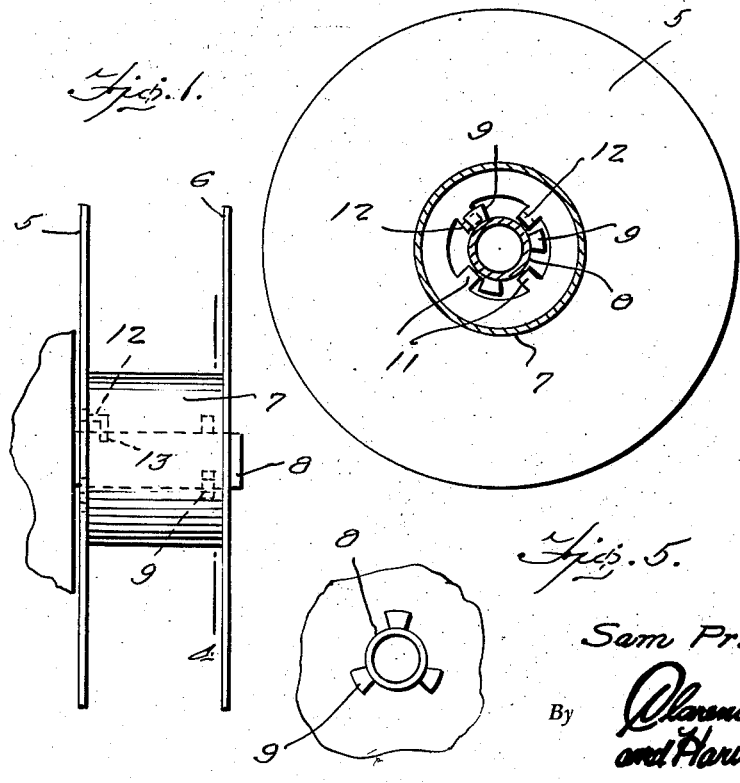
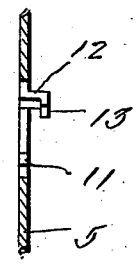
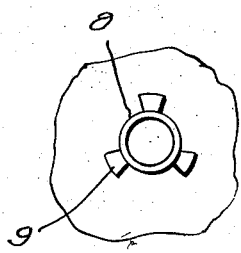

2,380,788

UNITED STATES PATENT OFFICE 2,380,788

MOTION PICTURE CAMERA SPOOL

Sam Prinzivalli, Brooklyn, N. Y.

Application June 15, 1944, Serial No. 540,419

2 Claims. (Cl. 242—70)

The present invention relates to new and useful improvements in spools for motion picture cameras and has for its primary object to provide means for preventing the improper mounting of the spool on the idler spindle of the camera so that the user is prevented from accidentally exposing the wrong side of the film.

A further object of the invention is to provide a spool structure which may be economically manufactured and at the same time is efficient and reliable in use, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a view in elevation showing the spool mounted on the spindle.

Figures 2 and 3 are end elevational views of the opposite ends of the spool.

Figure 4 is a transverse sectional view taken substantially on a line 4—4 of Figure 1.

Figure 5 is an end elevational view of the spindle, and

Figure 6 is a fragmentary sectional view taken substantially on a line 6—6 of Figure 3.

Referring now to the drawing in detail wherein for the purpose of illustration I have disclosed a preferred embodiment of the invention, the numerals 5 and 6 designate the flanges of the spool connected by the hub portion 7 in the usual manner.

The spool is designed for mounting on a spindle 8 forming part of the conventional camera construction, the free end of the spindle having a plurality of circumferentially spaced, radially extending lugs 9.

Each flange of the spool is formed with a central opening 5' and 6' respectively aligned with the hub, the opening 6' being adapted to receive the outer end of the spindle, the lugs 9 preventing insertion of the flange 6 beyond the lugs.

The opening of the flange 5 is formed with a pair of radially extending lugs 11 in the plane of the flange and a pair of axially extending lugs 12 extending inwardly of the hub of the spool and having angularly formed flanges 13 thereon extending radially inwardly with respect to the opening 5', as shown in Figure 3.

In order to properly position the spool on the spindle the opening 5' in the flange 5 is first placed on the end of the spindle, the lugs 11 entering the spaces between the lugs 9, the flanges 13 forming a stop to prevent further movement of the spool onto the spindle. The spool is then partially rotated to align the flanges 13 with the spaces between the lugs 9 and the spool may then be moved completely onto the spindle.

By providing the two types of lugs 11 and 12 on one end of the spool, the user can readily determine which end of the spool should first be placed on the spindle.

It is believed that the details of construction and manner of use of the device will be readily understood from the foregoing without further detailed explanation.

Having described the invention, what is claimed as new is:

1. A spool for motion picture camera film including a pair of spaced flanges and a hub portion connecting the flanges, said spool being adapted for mounting on a spindle provided with circumferentially spaced lugs, said flanges having openings for receiving the spindle, a plurality of lugs on one flange projecting radially inwardly of the opening of the flange and a plurality of lugs on said flange projecting from the edge of said opening inwardly of the hub and having radially inwardly extending flanges on the ends thereof, said lugs on said flange being adapted for successive insertion through the spaces between the lugs of the spindle for mounting the spool on the spindle by a partial rotation of the spool.

2. A spool for motion picture camera film comprising spaced flanges connected by a hub portion, said flanges having aligned central openings therein adapted for receiving a spindle for mounting the spool thereon, said spindle having circumferentially spaced lugs thereon, and lugs carried at the edges of one of said openings and adapted for successively entering the spaces between the lugs of the spindle, certain of said lugs of the spool being positioned axially behind the remaining lugs and offset from the spaces between the lugs of the spindle when said remaining lugs are aligned with said spaces, said first named group of lugs being adapted to enter said spaces by a partial rotation of the spool on the spindle.

SAM PRINZIVALLI.